United States Patent [19]

David

[11] Patent Number: 4,576,688

[45] Date of Patent: Mar. 18, 1986

[54] PRODUCTION OF POLY(P-PHENYLENE) FROM 4,4'-DIHALOBIPHENYL AND LITHIUM USING ULTRASONIC WAVES

[75] Inventor: Lawrence D. David, Florham Park, N.J.

[73] Assignee: Celanese Corporation, New York, N.Y.

[21] Appl. No.: 439,005

[22] Filed: Nov. 4, 1982

[51] Int. Cl.$^4$ .................... C08G 61/10; C08F 2/56
[52] U.S. Cl. .................. 204/157.62; 528/397; 523/300; 264/29.2
[58] Field of Search .................... 528/397; 204/159.11

[56] References Cited

U.S. PATENT DOCUMENTS

| | | | |
|---|---|---|---|
| 3,320,183 | 5/1967 | Brown | 528/397 |
| 3,340,230 | 9/1967 | Hoyt | 528/397 |
| 3,876,599 | 4/1975 | Attridge et al. | 526/154 |
| 3,926,848 | 12/1975 | Wristers et al. | 526/119 |
| 4,034,000 | 7/1977 | Schoenberg | 528/75 |
| 4,127,730 | 11/1978 | Wulff et al. | 204/159.15 |
| 4,207,405 | 6/1980 | Masler et al. | 524/414 |
| 4,302,567 | 11/1981 | Bahadir et al. | 526/159 |

OTHER PUBLICATIONS

Chemical Abstracts, vol. 96; 123373p (1982), Voronkov et al.
"Organic Sonochemistry–" Han et al., Tetrahedron Letters 22, pp. 2757–2758, 1981.

*Primary Examiner*—John C. Bleutge
*Assistant Examiner*—A. H. Koeckert
*Attorney, Agent, or Firm*—Depaoli & O'Brien

[57] ABSTRACT

This invention provides a process for the production of poly(p-phenylene) which involves subjecting a liquid reaction medium containing 4,4'-dihalobiphenyl and alkali metal, e.g. lithium coupling reactants to activation with ultrasonic energy.

7 Claims, No Drawings

PRODUCTION OF POLY(P-PHENYLENE) FROM 4,4'-DIHALOBIPHENYL AND LITHIUM USING ULTRASONIC WAVES

BACKGROUND OF THE INVENTION

Polyarylenes such as poly(p-phenylene) have excellent resistance to thermal oxidative and radiative degradation, and find utility as lubricants, insulators, pigments, ablative materials, oxidation inhibitors, stabilizers against heat and light, binders in heat shields, and the like.

U.S. Pat. No. 3,359,340 describes a process for producing polyphenylene which involves subjecting benzene vapor containing 0.1–5 percent benzoic acid to pyrolytic conditions.

U.S. Pat. No. 3,386,899 discloses the polymerization of benzene and polycyclic aromatic hydrocarbons by anodic oxidation in liquid hydrogen fluoride.

U.S. Pat. No. 3,480,568 discloses the conversion of benzene to poly(p-phenylene) with oxygen in the presence of $CuCl_2/Al_2O_3$ catalyst.

U.S. Pat. No. 3,565,832 discloses the conversion of aromatic hydrocarbons to polymers by reaction with oxygen in the presence of a Lewis Acid catalyst such as $BF_3$ or $FeCl_3$.

U.S. Pat. No. 3,798,281 describes a rapid process for producing polyarylenes which involves contacting an aromatic hydrocarbon with an $Al_2O_3/SiO_2$ catalyst in the presence of hydrogen at a temperature of at least about 425° C.

U.S. Pat. No. 3,829,518 describes a dehydrogenative coupling process for the polymerization of partially hydrogenated aromatic hydrocarbons which involves treating a partially hydrogenated aromatic hydrocarbon with a catalyst such as $MoO_3$ at elevated temperature and pressure in the presence of hydrogen.

U.S. Pat. No. 4,022,717 discloses a process for the oxidative coupling of arenes to polymers, which involves reacting at least one arene other than benzene in liquid hydrogen fluoride with oxygen in the presence of a soluble molybdenum catalyst at a temperature of 0°–120° C.

The prior art methods tend to be limited by one or more disadvantages. These include high consumption of electric power, consumption of large quantities of oxidants, production of polymer products containing toxic impurities, the use of a precious metal catalyst which requires recovery, low conversion to high molecular weight polymers, and the like.

Accordingly, it is an object of this invention to provide an improved process for the production of poly(p-phenylene).

It is another object of this invention to provide a process for producing poly(p-phenylene) with a molecular weight range suitable for conversion to carbon fibers.

Other objects and advantages of the present invention shall become apparent from the accompanying description and example.

Other prior art of interest with respect to the present invention relates to chemical reaction systems which utilize high frequency sonic energy to activate molecular reactions.

U.S. Pat. No. 3,630,866 describes a process for activating intra-chemical reactions which involves subjecting a fluid chemical reactant to ultrasonic energy in the frequency range of $1 \times 10^{10}$ to $1 \times 10^{15}$ hertz by passing the reactant within 2 microns of a thin layer piezoelectric transducer emitting the ultrasonic energy.

J. Org. Chem., 47, 751(1982) describes ultra-sound promoted reactions of zinc with $\alpha,\alpha'$-dibromo-o-xylene in the presence of dienophiles to yield cycloaddition products via an o-xylene intermediate.

Other organic sonochemistry publications of interest include J. Amer. Chem. Soc., 102, 7926(1980); Tetrahedron Letters, 22(29), 2757(1981); Tetrahedron Letters, 22(39), 3813(1981); and Tetrahedron Letters, 23(16), 1643 (1982).

DESCRIPTION OF THE INVENTION

One or more objects of the present invention are accomplished by the provision of a process for producing poly(p-phenylene) which comprises subjecting a liquid reaction medium containing 4,4'-dihalobiphenyl and alkali metal as coupling reactants to activation with ultrasonic energy.

The sonochemical reaction is conducted for a period of times between about 1–30 hours sufficient to effect the desired degree of molecular coupling and polymerization.

The coupling reaction proceeds readily at a temperature in the range between about 0°–150° C. The reaction is conducted conveniently at ambient conditions of temperature and pressure.

In a typical procedure an inert solvent medium containing 4,4'-dihalobiphenyl and alkali metal in a reactor is subjected to ultrasonic energy input. This can be accomplished by partially submerging the reactor in the reservoir of an ultrasonic laboratory cleaner apparatus (117V, 150W) with a 40–55 kilohertz sonic generator.

Solvents suitable for utility as a reaction medium diluent include tetrahydrofuran, dioxane, diglyme, dimethoxyethane, mineral oil, hexane, benzene, toluene, xylene, and the like.

The 4,4'-dihalobiphenyl reactant preferably is either 4,4'-dichlorobiphenyl or 4,4'-dibromobiphenyl.

The alkali metal is incorporated in the sonication medium in the form of ribbon, wire, or powder. Lithium metal is particularly preferred because is provides a superior combination of controlled conversion rates and selectivity to poly(p-phenylene), as compared to sodium or potassium metal.

The alkali metal is employed in at least a stoichiometric quantity, and preferably in a gram equivalent excess in the Wurtz-type coupling reaction:

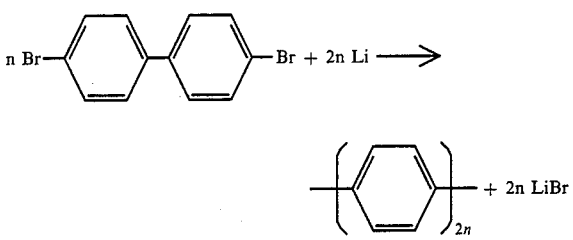

The ultrasonic-promoted coupling reaction is conducted under an inert atmosphere, such as moisture-free nitrogen, helium, or argon.

After the completion of the reaction, the poly(p-phenylene) product usually is present both as a solute in the solvent medium and as a high molecular weight solid precipitate.

The solid poly(p-phenylene) can be recovered by filtering the reaction medium. The poly(p-phenylene) fraction which remains dissolved in the filtrate can be recovered by distillation of the reaction medium, or by dilution of the reaction medium with a non-solvent (e.g., methanol) for poly(p-phenylene) to precipitate the product from solution.

The molecular weight of the poly(p-phenylene) product typically will be in the range between about 500-100,000, and higher. Poly(p-phenylene) having a molecular weight up to about 80,000 is soluble in a solvent such as tetrahydrofuran, benzene, or dimethylformamide.

In another embodiment, the present invention contemplates the spinning of a poly(p-phenylene) solution (THF) into a non-solvent (methanol) to form fibers. The poly(p-phenylene) fibers under pyrolysis conditions can convert to carbon fibers (theoretical carbon yield of 94.7%).

The following Example is further illustrative of the present invention. The specific ingredients and processing parameters are presented as being typical, and various modifications can be derived in view of the foregoing disclosure within the scope of the invention.

EXAMPLE

A mixture of 4,4'-dibromobiphenyl (31.2 g, 0.1 mole), lithium metal ribbon (1.9 g, 0.28 mole) and tetrahydrofuran (300 mls) is charged to a round bottom flask equipped with a stirrer and condenser.

The flask is partially submerged in an ultrasonic laboratory cleaner apparatus (Model HT 1.9, 40-55 kilohertz, SU-2 Generator, Blackstone Corp., Jamestown, N.Y.). The flask is heated to reflux (70° C.) under a nitrogen atmosphere, and the ultrasonic input is commenced.

After about 30 hours, the ultrasonic input is terminated and the reaction medium is quenched with water. The reaction mixture is filtered to recover a brown mud, which is dried in a vacuum oven.

The resultant rust-brown powder is ground and subjected to vacuum sublimation to remove unreacted 4,4'-dibromobiphenyl (0.3 g). A 13.6 g quantity of mustard brown powder is obtained (89.5% yield). The product melts at 130°-140° C.

Elemental analysis indicates an average empirical formula of $C_{110.1}H_{91.9}O_{4.82}Br$.

Under TGA test conditions, the product yields 27 weight percent char at 1000° C.

What is claimed is:

1. A process for producing poly(p-phenylene) which comprises subjecting a liquid reaction medium containing 4,4'-dihalobiphenyl and lithium metal as coupling reactants to activation with ultrasonic energy.

2. A process in accordance with claim 1 wherein the ultrasonic frequency is in the range between about 20-100 kilohertz.

3. A process in accordance with claim 1 wherein the liquid reaction medium comprises an inert solvent.

4. A process in accordance with claim 1 wherein the 4,4'-dihalobiphenyl reactant is 4,4'-dichlorobiphenyl.

5. A process in accordance with claim 1 wherein the 4,4'-dihalobiphenyl reactant is 4,4'-dibromobiphenyl.

6. A process in accordance with claim 1 wherein the sonochemical coupling reaction is conducted at a temperature in the range between about 0°-150° C.

7. A process in accordance with claim 1 wherein the produced poly(p-phenylene) has a molecular weight in the range between about 500-100,000.

* * * * *